United States Patent [19]

Calmettes et al.

[11] Patent Number: 5,131,698

[45] Date of Patent: Jul. 21, 1992

[54] DEVICE FOR HERMETICALLY COUPLING TWO SMOOTH TUBES DISPOSED END TO END

[75] Inventors: Lionel Calmettes; Pascal Detable, both of Romorantin Lanthenay, France

[73] Assignee: Etablissements Caillau, France

[21] Appl. No.: 702,957

[22] Filed: May 20, 1991

[30] Foreign Application Priority Data

May 23, 1990 [FR] France ................ 90 06475

[51] Int. Cl.⁵ ............................ F16L 21/00
[52] U.S. Cl. ........................ 285/419; 285/253; 285/420; 285/236; 24/19; 24/20 LS
[58] Field of Search ............ 285/419, 373, 252, 253, 285/420, 236, 406, 407, 410, 424, 322; 24/279, 19, 20 LS

[56] References Cited

U.S. PATENT DOCUMENTS

| 2,541,205 | 2/1951 | Christophersen | 285/410 |
| 4,466,642 | 8/1984 | Tonchen | 285/419 |
| 4,616,858 | 10/1986 | Sauer | 285/419 |
| 4,627,645 | 12/1986 | Sauer | 285/236 X |
| 4,715,626 | 12/1987 | Gehring et al. | 285/236 X |
| 4,789,189 | 12/1988 | Robertson | 285/373 |
| 4,813,718 | 3/1989 | Matter | 285/373 |
| 4,813,720 | 3/1989 | Cassel | 285/419 |

FOREIGN PATENT DOCUMENTS

| 2597169 | 4/1986 | France | 285/410 |
| 427432 | 10/1948 | Italy | 285/410 |

Primary Examiner—Randolph A. Reese
Assistant Examiner—Timothy Aberle
Attorney, Agent, or Firm—Marshall & Melhorn

[57] ABSTRACT

A device is disclosed for hermetically coupling two smooth tubes of the same diameter disposed end to end, particularly for coupling two elements of the exhaust pipe of an engine, such as those of automobile vehicles. A bush in one piece comprises a longitudinal slot provided with two radial assembly lips and surrounds the opposite ends of the two tubes on which it is clamped by a screw or a bolt traversing the radial lips. The bush presents two frusto-conical ends located on either side of a cylindrical central portion intended to be mounted astride the zone of connection of the two tubes and each lip of the longitudinal slot comprises at least one rigidifying element extending between said lip and each of the corresponding frusto-conical ends of the bush.

8 Claims, 2 Drawing Sheets

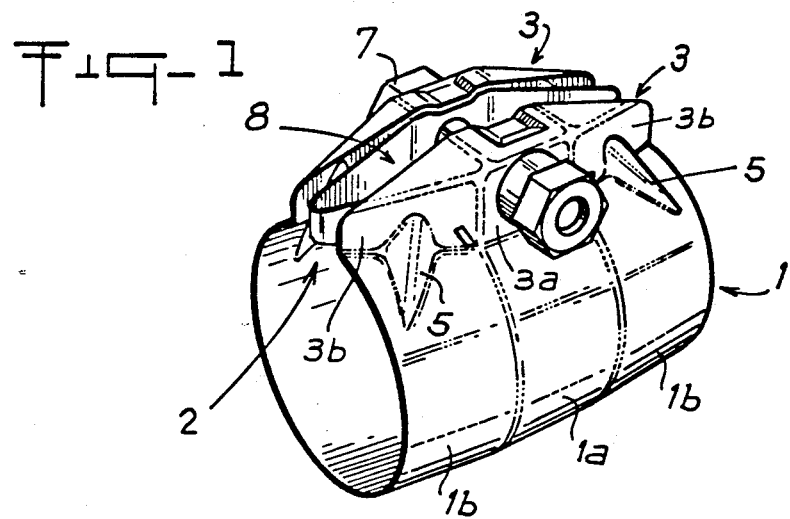
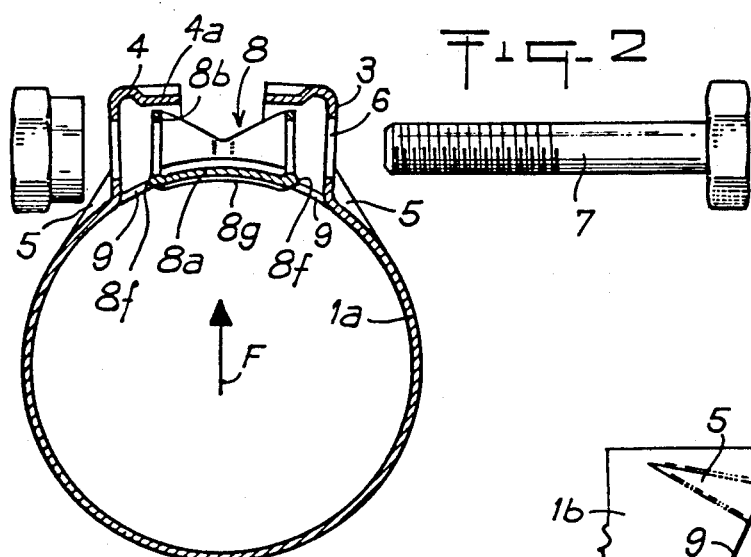
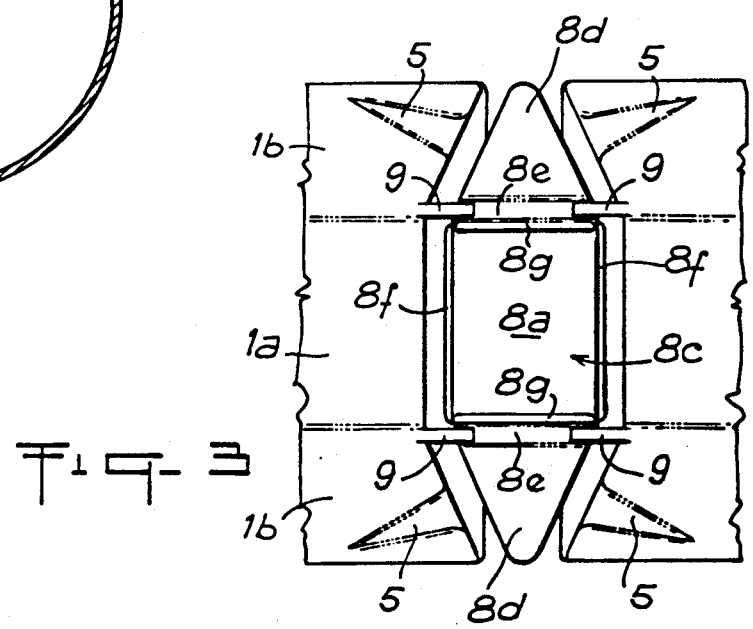

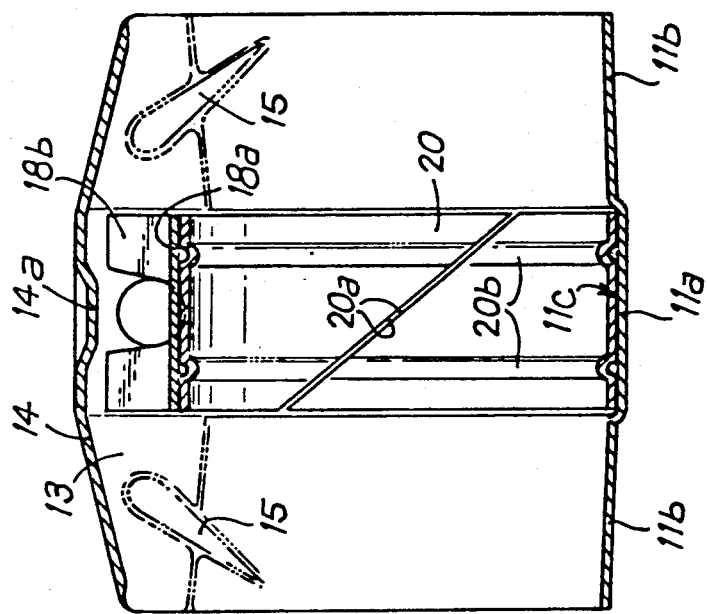
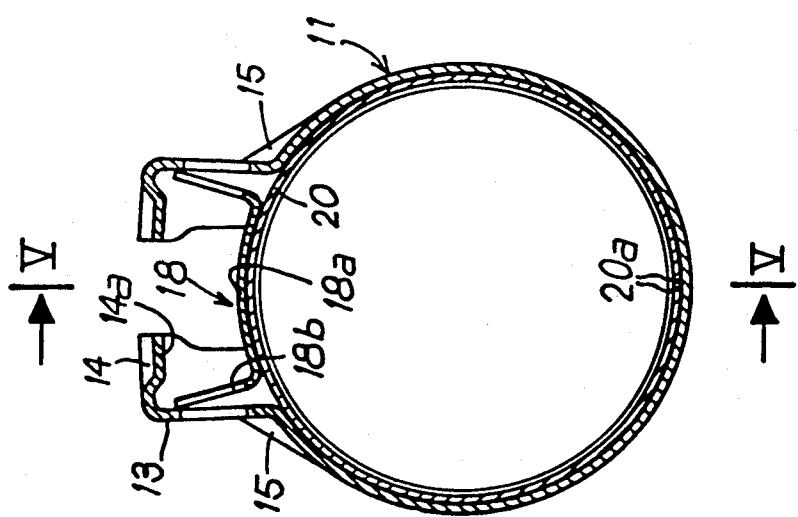

DEVICE FOR HERMETICALLY COUPLING TWO SMOOTH TUBES DISPOSED END TO END

FIELD OF THE INVENTION

The present invention relates to a device for hermetically coupling two smooth tubes, disposed end to end.

BACKGROUND OF THE INVENTION

FR-A-2 597 169 in particular already discloses a device for hermetically coupling two smooth tubes, particularly adapted to be used for the connection end to end of two exhaust pipe elements of a vehicle engine.

The known device comprises a longitudinally split metal bush or sleeve partially surrounding the two tubes in the region of the join, this bush presenting two radial lips assembled and clamped by two screws or bolts which pass therethrough. The Patent mentioned above proposes to ensure a rigidification of the lips by a fold, extending parallel to the slot and directed there opposite.

However, it has been observed that such rigidification of the lips of the bush is frequency insufficient to transmit correctly to the bush the tightening efforts of the screws or bolts and thus to ensure complete immobilization and a satisfactory seal of the connection of the two tubes.

It is therefore an object of the invention to provide a device for hermetically coupling two smooth tubes of the same diameter, disposed end to end, this device being of the type which has just been recalled but incorporating various improvements intended to overcome the drawbacks of the known devices.

SUMMARY OF THE INVENTION

According to the invention, the bush present two frusto-conical ends located on either side of a cylindrical central portion adapted to be mounted astride the zone of connection. Furthermore, each radial lip comprises at least one rigidifying element extending between said lip and each of the corresponding frusto-conical ends.

Thanks to these arrangements, clamping of the tubes is particularly efficient over the whole length of the bush, even if there is only one screw or one bolt for clamping the lips, and the seal of the connection is also improved with respect to what may be obtained with the heretofore known devices.

BRIEF DESCRIPTION OF THE DRAWINGS

The invention will be more readily understood on reading the following description with reference to the accompanying drawings, in which:

FIG. 1 is an outside view in perspective of a device according to the invention, before the tubes to be coupled are clamped.

FIG. 2 is a transverse section of the device, the section being made in the axis of the fixing bolt.

FIG. 3 is a view in the direction of arrow F of FIG. 2, of the interior of the device.

FIG. 4 is a section similar to FIG. 2, in the case of a variant embodiment of the invention.

FIG. 5 is a section along V—V of FIG. 4.

DETAILED DESCRIPTION OF THE DRAWINGS

Referring now to the drawings, and firstly to FIGS. 1, 2 and 3, the hermetic coupling device essentially comprises a generally metallic bush or sleeve, designated by general reference numeral 1 and presenting a longitudinal slot 2. The edges of the slot are defined by substantially radial lips 3 whose great rigidity is ensured by various arrangements which will be specific.

The bush proper comprises a cylindrical central part 1a and two slightly frusto-conical ends 1b, their smallest diameter being located on the two terminal faces of the bush. In practice, the difference between the diameter of the cylindrical part 1a (of the order of 60 millimeters) and the small diameter of the ends 1b will be very small, of the order of one or a few millimeters. This difference has been voluntarily exaggerated in the drawings.

Each lip 3 comprises a central part 3a corresponding substantially to the width of the central part 1a of the bush, and two ends 3b, inclined towards the slot 2, with respect to the central part 3a. This structure already provides a certain rigidity for the lips 3, but it may be considerably improved even more.

On the one hand, the upper edge of each lip 3 is reinforced by a fold 4 extending above the longitudinal slot, preferably parallel thereto. This fold is itself advantageously reinforced in its central zone by a stamped-out hollow 4a, clearly visible in FIG. 2.

On the other hand, in the end zones 3b of each lip, there is provided a rigidifying element 5 which connects the lip and the corresponding end 1b of the bush. This rigidifying element will preferably be constituted by a gusset 5 resulting from the metal plate of the bush being stamped to project outwardly and inclined, with respect to the transverse plane passing through its root on the end 3b of the lip, towards the small terminal base of the corresponding frusto-conical end 1b.

In this way, each lip 3 has the general form of an open box, solidly anchored on the wall of the bush 1, particularly in the vicinity of the frustoconical ends thereof.

The central parts 3a of the two lips 3 are each pierced with a hole 6 allowing the passage of a bolt 7.

The man skilled in the art will already have understood the use of the device which has just been described. The bush 1 is fitted on one of the tubes (not shown) then the other tube is itself fitted in the bush. After having checked that the ends of the two tubes are in contact with each other in the central part 1a of the bush, the operator tightens the bolt 7 strongly in order to bring the two lips 3 together, reducing the width of the slot 2.

Thanks to its frusto-conical ends 1b and to the rigidity of its lips 3, the bush energetically clamps the tubes, particularly by the terminal faces of the ends 1b. Virtually all the tightening effort of the bolt 7 is in fact transmitted to the ends 1b, particularly via the gussets 5.

Furthermore, seal of the connection is ensured by the contact between the outer surface of the tubes and the inner surface of the central part 1a of the bush, but leakages may occur opposite the slot of the bush, insofar as lips 3 have not come into contact with each other.

In order to eliminate these residual leakages, the invention provides a complementary sealing member which is disposed at least between the lips 3 of the slot 2.

As clearly shown in FIG. 2, this complementary member is constituted by a staple 8 whose transverse section is substantially in the form of a U.

The web 8a of the staple presents a curved profile whose diameter is substantially equal to that of the central part 1a of the bush. The side arms 8b of the
} staple are preferably parallel to each other or very slightly flared. Their height is at the most equal to that of the opposite faces of the lips 3.

In the longitudinal direction, the staple 8 is divided into three parts, clearly visible in FIG. 3. The central part 8c presents a length substantially equal to the width of the central part 1a of the bush, whilst the two ends 8d have an approximately triangular shape. These latter are separated from the central part 8c by two grooves 8e, hollowed out on the inner face of the bottom 8a and consequently projecting outwardly.

Small tabs 9, made by cut-out and folding in the lips 3, extend transversely to the slot 2 and, when the staple 8 is in place, are hosed in its grooves 8e. Before clamping the bush 1 under the conditions set forth hereinabove, the staple 8 is guided transversely by the cooperation of the tabs 9 and the grooves 8e and cannot escape as soon as the bolt 7 is placed in position.

Finally, it will be emphasized that seal beads, constituted by stamped out parts of small depth, are advantageously provided ,in the central pat of the staple, on the one hand on the sides 8b, in the vicinity of the connection with the bottom 8a (beads 8f), on the other hand, on the bottom 8a itself, in the vicinity of grooves 8e (beads 8g). The projection of beads 8f on the outer faces of the sides 8b as well as that of beads 8g on the inner face of the bottom 8a will preferably be of the order of some tenths of millimeters; for greater clarity, it has been voluntarily enlarged in FIGS. 2 and 3.

During tightening of bolt 7, the sides 8b of the staple come into tight abutment on the opposite faces of the lips 3, whilst the bottom 8a is strongly applied on the outer surface of the tubes, thus obturating, virtually completely, the zone of connection of he tubes, thanks in particular to the presence of seal beads 8f and 8g.

Reference will now be made to FIGS. 4 and 5 which show a variant embodiment of the complementary sealing member. The elements already described bear the same reference numerals, increased by 10.

The bush 11, the structure of its lips 13 as well as their rigidifying means are identical to what has been described hereinbefore. However, the central part 11a is slightly stamped outwardly so as to define an annular inner housing 11c of small depth.

The complementary sealing member is constituted by a thin band 20, preferably made of metal, wound on itself and disposed in housing 11c. The two ends 20a of the band are bevelled as clearly shown in FIG. 5 and its width is substantially equal to that of housing 11c, whilst its thickness is virtually identical to the depth of said housing. (It will be noted that the two ends 20a of the band 20 are preferably located opposite the lips 13 of the bush, as indicated in FIG. 4; nevertheless, the representation of FIG. 5 is intended to facilitate comprehension). On each longitudinal edge of the band there is provided at least one stamped out part 20b forming bead, projecting on the inner face of the band.

A staple 18, likewise constituted by a thin metal plate of U-section, is fixed by its bottom 18a to the band 20, for example by means of welding spots. The length of the staple 18 is preferably equal to the width of the band 20.

During tightening of the bolt (not shown), the band 20 is strongly applied on the tubes, and its beads 20b, which are placed on either side of the zone of connection of the tubes, are somewhat elastically crushed on the outer surface of the tubes. In the zone of the slot of the bush, the staple 18 itself applies the band 20 on the tubes, ensuring the pressure necessary for a good seal. The length of the band 20 is such that, after clamping, its ends 20a are applied against each other, Thus virtually avoiding any leakage in this zone.

What is claimed is:

1. A device for hermetically coupling the butting ends of two tubes comprising:

a sheet metal cylindrical sleeve adapted to surround the butting ends of the two tube, said sleeve being formed with a central cylindrical portion adapted to surround the butting ends of the two tubes and a frusto-conical portion formed to extend from the opposite sides of the central cylindrical portion with the terminal ends of the frusto-conical portions adapted to securely engage the exterior surfaces respectively of the two tubes, said sleeve having a longitudinal slot extending the length of the central cylindrical portion and the frusto conical portions;

a lip extending radially outwardly from said sleeve adjacent opposite sides of the longitudinal slot, each of said lips including at least one rigidifying element extending between said lip and the corresponding frustoconical portion of said sleeve a complementary sealing member disposed between said lips of the longitudinal slot, wherein said complementary sealing member is constituted by a staple of generally U-shaped cross-section having a convexly arcuate base and two radially extending sides, the two sides of the staple abutting the opposite faces of said lips, and the base abutting the portion of the two tubes in the longitudinal slot; and fastening means coupling said lips and adapted to urge said lips toward one another whereby said sleeve may be effectively clamped to the two tubes by said fastening means to provide a hermetic coupling between the butting ends of the two tubes.

2. The device of claim 1 wherein each lip is reinforced by a fold extending above and parallel to the longitudinal slot.

3. The device of claim 2 wherein the fold of each lip is reinforced by a stamped recess in the fold.

4. The device of claim 1 wherein the rigidifying element of each of said lips is constituted by an inclined gusset extending between said lip and the terminal end of the respective frusto-conical portion.

5. The device of claim 1 wherein said sleeve is provided with at least one transverse tab extending in the longitudinal slot and the staple is provided with at lest one transverse groove on the edge of the staple, said tab cooperating with said groove to position the staple.

6. The device of claim 1 wherein said complementary sealing member includes a metal band wound on itself, said band completely surrounding the opposite ends of the two tubes and disposed between the base of said staple and the portion of the two tubes in the longitudinal slot, while a cylindrical housing for said metal band is provided in the inner central part of the sleeve.

7. The device of claim 6 wherein said ends of the metal band are bevelled.

8. The device of claim 6 wherein each of the longitudinal edges of said metal band presents at least one sealing bead projecting inwardly of said band after it has been wound on itself.

* * * * *